US008602307B2

(12) United States Patent
Marchesi

(10) Patent No.: US 8,602,307 B2
(45) Date of Patent: Dec. 10, 2013

(54) SEAT, OPERATING AND CONTROL SYSTEM OF SEATS, METHOD OF OPERATING AND CONTROLLING SEATS

(75) Inventor: Gian-Roberto Marchesi, Vicenza (IT)

(73) Assignee: Clerprem S.p.A., Carrè, Vicenza (IT)

( * ) Notice: Subject to any disclaimer, the term of this patent is extended or adjusted under 35 U.S.C. 154(b) by 0 days.

(21) Appl. No.: 13/000,517

(22) PCT Filed: Jan. 28, 2010

(86) PCT No.: PCT/IB2010/050389
§ 371 (c)(1),
(2), (4) Date: Dec. 21, 2010

(87) PCT Pub. No.: WO2010/086817
PCT Pub. Date: Aug. 5, 2010

(65) Prior Publication Data
US 2011/0278884 A1  Nov. 17, 2011

(30) Foreign Application Priority Data

Jan. 30, 2009  (EP) ..................................... 09425031

(51) Int. Cl.
*G06K 7/10* (2006.01)
(52) U.S. Cl.
USPC .................... 235/462.01; 340/10.52

(58) Field of Classification Search
USPC ................................... 235/462.01; 340/10.52
See application file for complete search history.

(56) References Cited

U.S. PATENT DOCUMENTS

| 6,658,572 | B1 | 12/2003 | Craig |
| 6,964,370 | B1* | 11/2005 | Hagale et al. ................. 235/380 |
| 2004/0195892 | A1* | 10/2004 | Daniels ...................... 297/378.1 |
| 2009/0174531 | A1* | 7/2009 | Ohashi et al. .............. 340/10.52 |
| 2010/0125353 | A1* | 5/2010 | Petit-Huguenin .............. 700/94 |

FOREIGN PATENT DOCUMENTS

| DE | 10158293 | 6/2003 |
| GB | 2072881 | 10/1981 |
| WO | 94/10877 | 5/1994 |
| WO | 2008/036539 | 3/2008 |

* cited by examiner

*Primary Examiner* — Allyson Trail
(74) *Attorney, Agent, or Firm* — Shoemaker and Mattare

(57) ABSTRACT

A seat for passengers comprising a seat body and at least one seat portion, wherein the seat comprises identification devices able to receive and verify the correctness of an identification code of the seat and activation devices, operatively connected to the identification devices, so as to be enabled and/or disabled depending on the result of verification of the identification code.

14 Claims, 3 Drawing Sheets

SEAT, OPERATING AND CONTROL SYSTEM OF SEATS, METHOD OF OPERATING AND CONTROLLING SEATS

FIELD OF THE INVENTION

The present invention relates to a seat for various applications, such as for example a train, ship, plane seat and so on. Such applications are purely indicative and should not be considered in any way exhaustive. The present invention also relates to an operating and control system of seats and a method of operating and controlling seats.

BACKGROUND OF THE INVENTION

As is known, in the transport sector passenger seats are often inopportunely occupied by individuals without tickets or bookings. This inevitably leads to discomfort for the passengers. In addition, checking that the passengers are seated in the right seats and the relative payment of the tickets entails considerable costs in terms of the staff required for such operations.

SUMMARY OF THE INVENTION

The purpose of the present invention is to overcome the drawbacks mentioned in relation to the known art.

Such drawbacks are solved by a seat according to claim 1, by an operating and control system according to claim 13 and by a method of operating and controlling according to claim 14.

Other embodiments of the seat according to the invention are described in the subsequent claims.

BRIEF DESCRIPTION OF THE DRAWINGS

Further characteristics and advantages of the present invention will be more clearly comprehended from the description given below of a preferred and non-limiting embodiment, wherein.

DETAILED DESCRIPTION OF THE INVENTION

Figure 1:
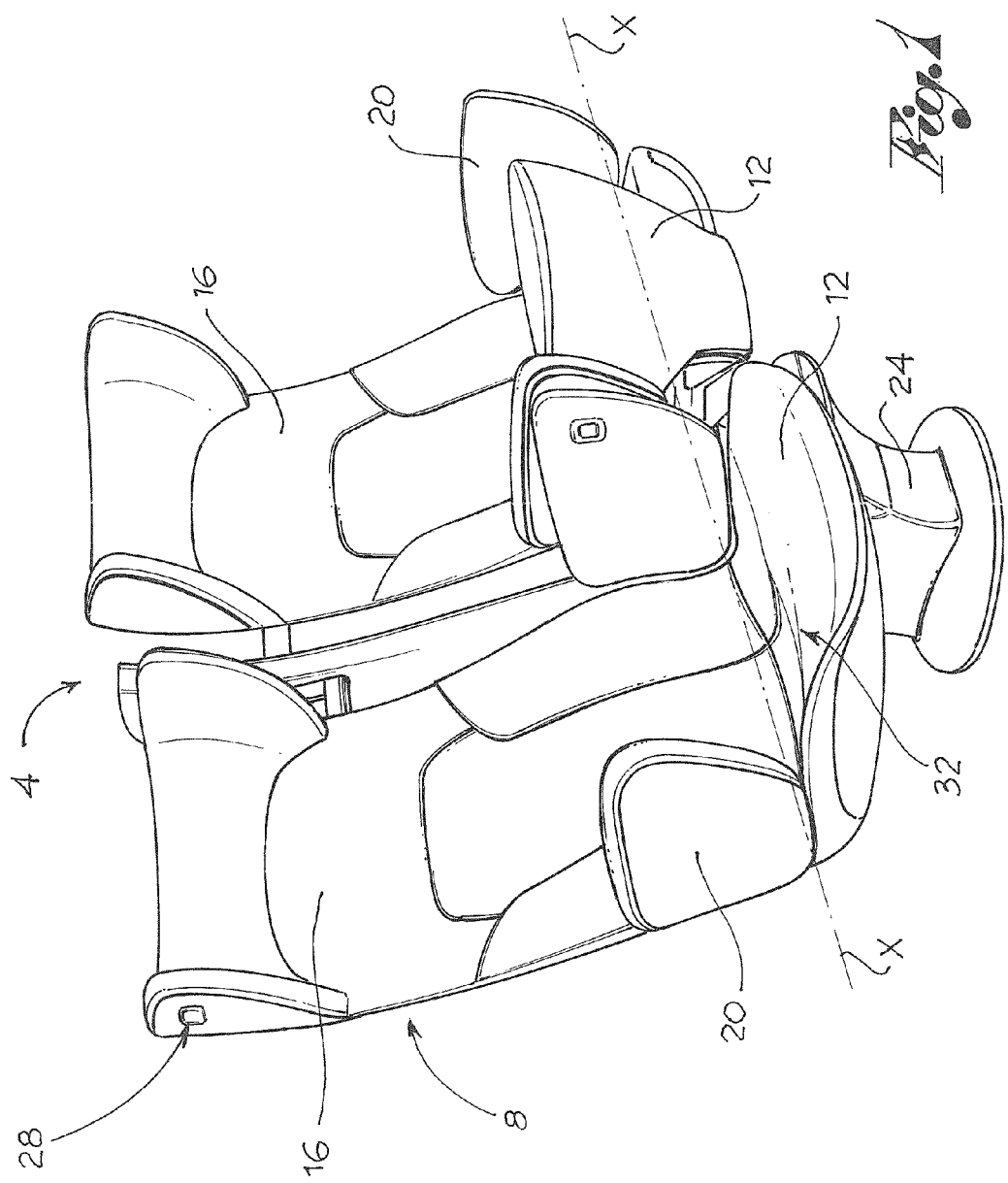
FIG. 1 shows a perspective view of a seat according to one embodiment of the present invention.
Figure 2:
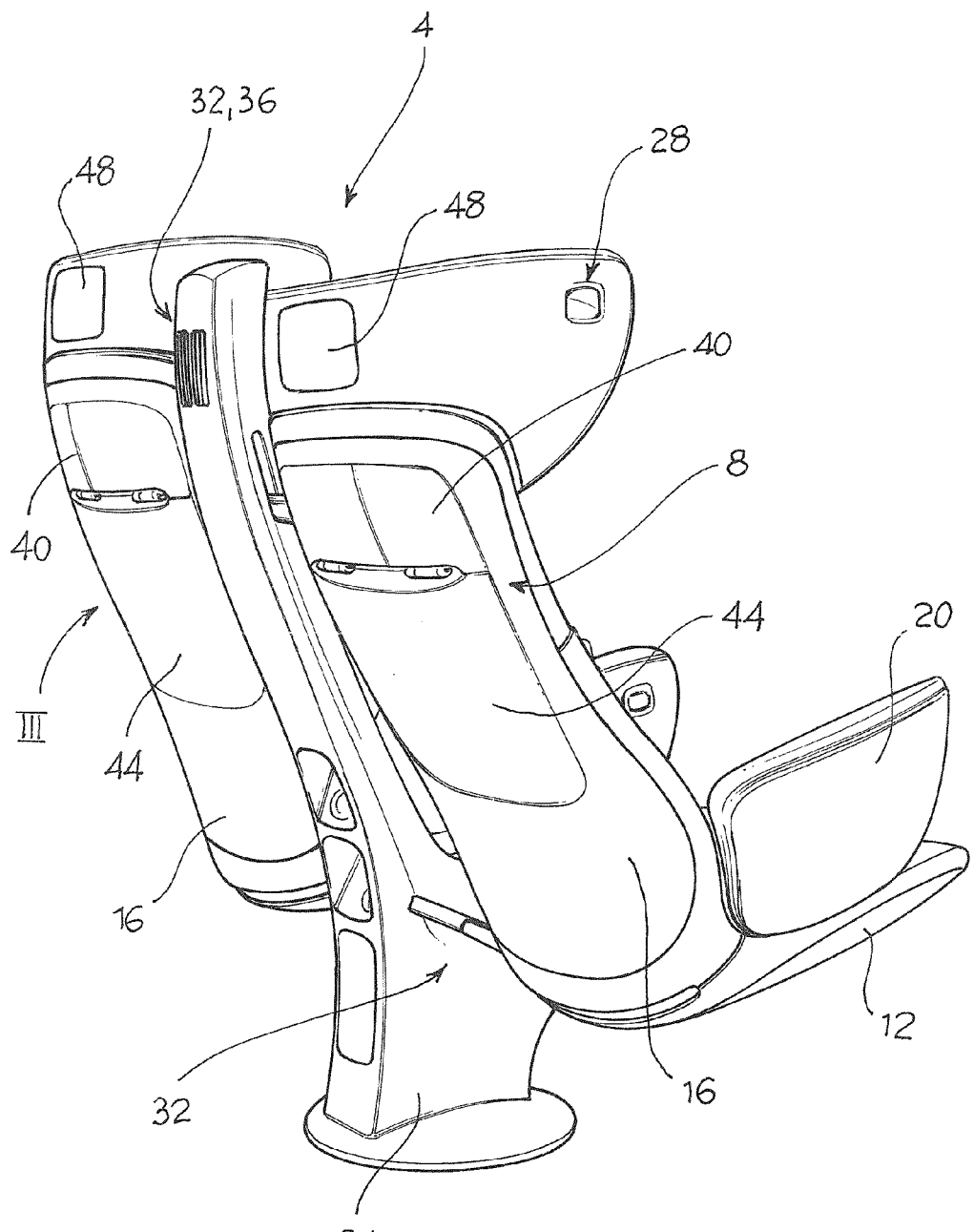
FIG. 2 shows a perspective view of the seat in FIG. 1, from a different angle.
Figure 3:
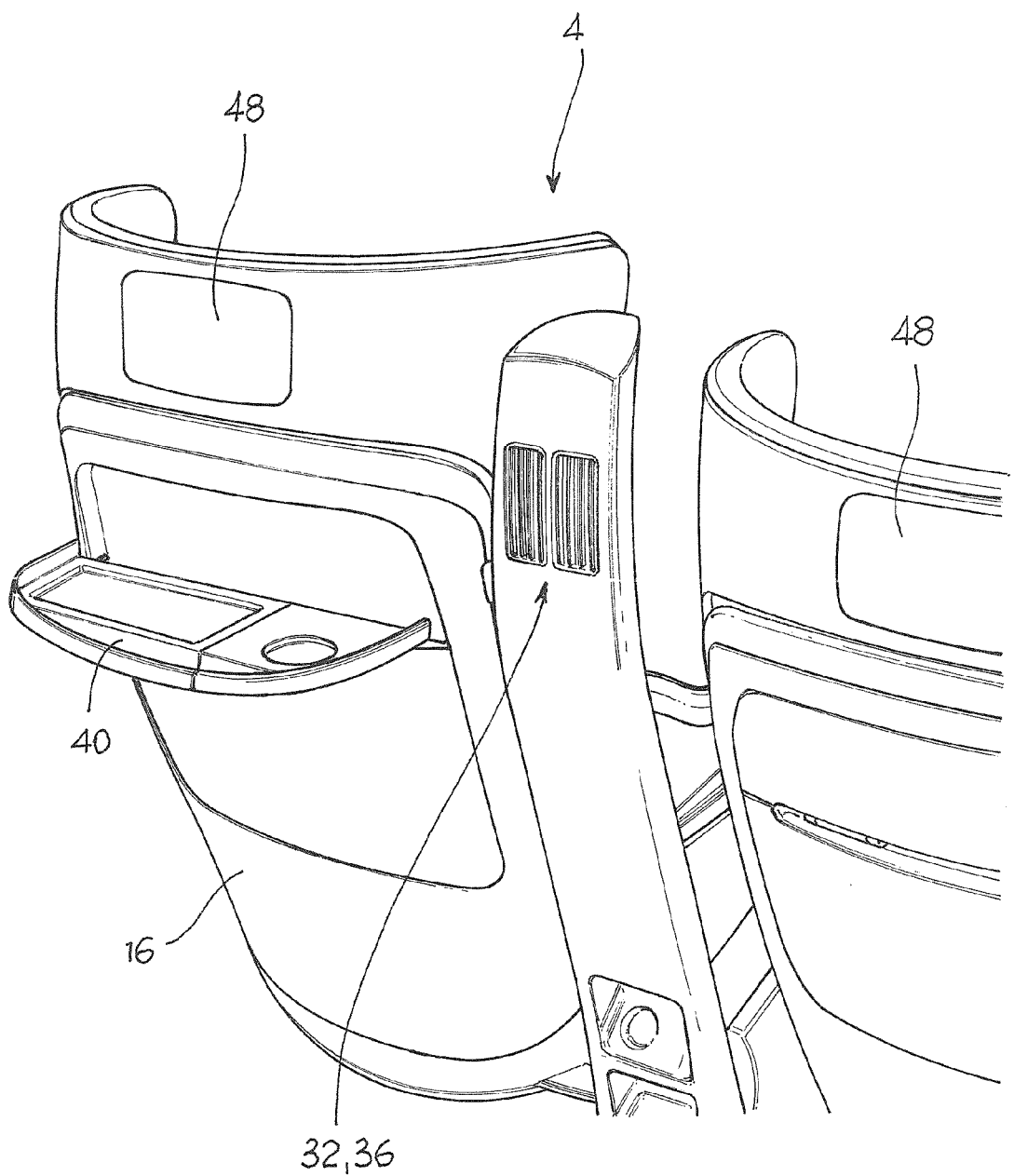
FIG. 3 shows a perspective view of the enlarged detail III in FIG. 2 in a different operating condition.

With reference to the aforesaid figures, reference numeral 4 has been used to globally denote a passenger seat, for example for a train. As already indicated the use of the seat 4 in railway applications is purely indicative and should not be considered limiting.

The passenger seat 4 comprises a seat body 8 having at least one seat portion 12. According to one embodiment, the seat body 8 comprises a backrest 16 connected to the seat portion 12.

The seat may have arms 20 and at least one support element 24 for the support and connection of the seat body 8 to the floor and/or wall.

For example, the seat body 8 is supported to overhang the support element 24. According to one embodiment, the support element supports a pair of overhanging seat portions 12 with respective backrests 16 and is positioned between them.

Advantageously, the seat 4 comprises identification devices 28 able to acquire and check the correctness of an identification code of the seat 4 and activation devices 32, operatively connected to the identification devices 28, so as to be enabled and/or disabled depending on the result of verification of the identification code.

According to a possible embodiment, the identification devices 28 and/or activation devices 32 of the seat 4 are at least partially lodged inside the support element 24.

According to one embodiment, the identification devices 28 comprise a bar-code reader or an optical, radio frequency or keypad system for the insertion of a code.

Magnetic readers able to read information contained in portable memory systems such as electronic keys or magnetic strip cards which the identification code of the seat has been memorized on can also be used.

The identification devices 28, present on the seat 4, are therefore able to receive an input identification code, check its correspondence with the identification code of the seat 4 and respectively activate or deactivate the activation devices 32 of the seat 4 following positive or negative verification.

According to one possible embodiment, the activation devices 32 are connected to an electric power supply of the seat 4, so as to respectively enable or disable the electric power supply of the seat 4 following positive or negative verification of the identification code. For example the electric powering of the seat 4 may be achieved using appropriate cabling preferably lodged inside the support element 24 of the seat 4.

According to one possible embodiment, the activation devices of the seat 4, are connected to a release system of the seat portion 12 making it possible to respectively enable or disable the seat portion 12 either manually or automatically (by means of an electric, electric-pneumatic actuator, etc.), following positive or negative verification of the identification code. For example, the seat portion 12 may be kept in a closed position by means of a mechanical or gas or any other type of return spring, and respectively released/blocked following positive or negative verification of the identification code.

According to one embodiment, the activation devices 32 comprise drive means to move the seat portion 12 and/or the backrest 16 of the seat 4 from an open configuration of use to a closed configuration of non-use.

Preferably, the drive means are able to provide a 'sliding' function of the seat so as to produce a continual adjustment of inclination both of the backrest 16 and of extraction of the seat portion 12.

For example, the drive means are controlled so as to pass to an open configuration in the case of positive verification of the identification code of the seat and vice versa. By way of example, FIG. 1 shows a double seat 4, with the left seat shown in an open configuration (with the seat portion lowered) and the right seat shown in a closed configuration (with the seat portion raised).

Preferably, the seat portion 12 is attached to the seat body 8 so as to be able to rotate in relation to a horizontal rotation axis X-X and rotate from a horizontal position in which the seat 4 is in use to an essentially vertical position of non-use of the seat 4, so as to prevent access to the said seat portion when verification of the identification code is negative.

According to one embodiment, the activation devices 32 comprise additional seat devices comprising for example heating and/or cooling devices 36, means of adjusting the seat portion 12, the backrest 16 or portions of the same, pull-out tables 40, storage compartments 44, WI FI connection devices, lighting devices of the seat 4, a monitor 48, preferably touch-screen.

The lighting devices may, as required, be used either as courtesy lights or as reading lights. Preferably, in the case of correct identification of the seat 4, the monitor 48 visualizes a welcome message to the user, confirming identification.

According to one possible embodiment, the activation devices 32 comprise means of detecting the presence of a passenger on the seat 4, able to detect the presence of a passenger occupying the seat so as to enable the activation devices when the seat 4 is occupied and disable the activation devices when the seat 4 is not occupied by a passenger.

For example, the means of detection may comprise at least one pressure sensor positioned in the seat portion 12 and/or the backrest 16 so as to detect whether the seat 4 is effectively occupied by a passenger.

Preferably, the seat 4 is connected to a processor unit able to monitor the status of the seat 4, signalling in real time whether the seat 4 is in use or not.

Advantageously, the invention also relates to a system for operating and controlling the passenger seats 4 comprising at least one seat 4 and at least one processor unit connected to said seat 4 so as to monitor in real time the functioning status of the seats.

This way the unit can signal the effective availability of vacant seats and any anomalies present in the occupation of the seats.

The method of operating a seat according to the present invention will now be described. Said method comprises the phases of associating an identification code with the seat 4, fitting the seat 4 with identification devices 28 able to acquire an external identification code and compare it to the identification code of the seat 4. In addition the method foresees fitting the seat 4 with activation devices 32 to control the main and additional functions of the seat 4. Specifically, the activation devices 32 are operatively connected to the identification devices 28, so as to power the activation devices 32 only when the code acquired by the identification devices and the identification code of the seat correspond.

If the identification process fails, the activation devices 32 are disabled so as to make all the main and additional functions of the seat 4 inactive and unavailable 4.

Preferably, in the case of non-identification, the seat portion 12 of the seat 4 does not open, making physical access to the seat 4 impossible and therefore making the said seat 4 totally non-utilizable.

As may be seen from the description, the seat of the present invention makes it possible to overcome the drawbacks presented of the seats of the known art.

Specifically, the seat according to the invention allows access and use only by a user in possession of a relative identification code.

Said identification code may be issued to the user in various ways at the moment of purchase of the ticket. For example it may be an alphanumerical code, an electronic key, a slip with a bar-code and so on.

This way until the user inserts his/her identification code, the seat remains in a non-use configuration in other words is deactivated and preferably closed so as to prevent physical access to the seat.

This way the risk of a user taking a seat he/she has not paid for and/or reserved is eliminated.

In addition, by connecting all the seats to a central processing unit, it's possible to have real time feedback on seat availability.

In addition, verification of the passengers' possession of tickets is simplified to the point that it is hardly necessary.

In fact, mere use of the seat automatically implies possession of the identification code and therefore of the travel ticket having been purchased by the occupant.

In addition considerable energy saving is achieved.

In fact when the passenger is not using the seat, even temporarily, it returns to the closed configuration and thus deactivates all the functions requiring energy absorption, such as for example video screens, air-conditioning of the seat, radio, WI FI devices and similar.

In addition, optimisation of space in the area the seat is located in is achieved. For example, in a railway application, when the seats are not in use and therefore closed back, there is more space and the passengers adjacent to the seat not in use can travel in greater comfort.

A person skilled in the art may make numerous modifications and variations to the seats described above so as to satisfy contingent and specific requirements, while remaining within the sphere of protection of the invention as defined by the appended claims.

The invention claimed is:

1. Seat for passengers comprising a seat body having at least one seat portion, wherein the seat comprises
    identification devices able to receive and verify the correctness of an identification code of the seat and
    activation devices, operatively connected to the identification devices, so as to be enabled and/or disabled depending on the result of verification of the identification code,
    wherein the activation devices comprise drive means for moving the seat portion and/or a backrest of the seat from an open configuration enabling use of the seat to a closed configuration preventing use of the seat, the drive means being controlled so as to position the seat in said open configuration in case of positive verification of the identification code and to position the seat in the closed position in case of negative verification.

2. Seat according to claim 1, wherein the identification devices comprise a barcode reader or an optical, radio frequency or keypad system for the insertion of a code, able to receive an input identification code, check its correspondence with the identification code of the seat and respectively activate or deactivate activation devices of the seat following positive or negative verification.

3. Seat according to claim 1, wherein the activation devices are connected to an electric power supply of the seat, so as to respectively enable or disable electric powering of the seat following positive or negative verification of the identification code.

4. Seat according to claim 1, wherein the seat portion is attached to the seat body so as to be able to rotate from a horizontal position in which the seat is in use to an essentially vertical position of non-use of the seat, so as to prevent access to the seat portion.

5. Seat according to claim 1, wherein the activation devices comprise additional seat accessories comprising at least one of the following: heating and/or cooling devices, means of adjusting the seat portion, the backrest or portions of these, pull-out tables, storage compartments, WI FI connection devices, lighting devices of the seat, monitor.

6. Seat according to claim 1, wherein the activation devices comprise means of detecting the presence of a passenger on the seat, able to detect the presence of a passenger occupying the seat so as to enable the activation devices when the seat is occupied and disable the activation devices when the seat is not occupied by the passenger.

7. Seat according to claim 6, wherein said means of detection comprise at least one pressure sensor positioned in the seat portion and/or the backrest so as to detect whether the seat is effectively occupied by a user.

8. Seat according to claim 1, wherein said seat is connected to a processor unit able to monitor the status of the seat, signaling in real time whether the seat is in use or not.

9. Seat according to claim 1, comprising a support element mechanically connected to the seat body, so that the seat body is supported to overhang the support element.

10. Seat according to claim 9, wherein the support element supports a pair of seat portions with respective backrests overhanging it.

11. Seat according to claim 9, wherein said support element contains the identification devices and/or activation devices of the seat at least partially.

12. Operating and control system of seats for passengers comprising at least one seat according to claim 1, at least one processor unit connected to said seats so as to monitor in real time the functioning status of the seats, said unit signaling the effective availability of seats.

13. Method of operating and controlling a seat according to claim 1, comprising the phases of:
 associating an identification code with the seat,
 fitting the seat with identification devices able to acquire an external identification code and compare it to the identification code of the seat,
 fitting the seat with activation devices to control the main and additional functions of the seat,
 operatively connecting the activation devices to the identification devices, so as to power the activation devices only when the code acquired by the identification devices and the identification code of the seat correspond.

14. Method according to claim 13, comprising the phase of closing the seat portion of the seat so as to make access to the seat impossible in the case of noncorrespondence between the code acquired by the identification devices and the identification code of the seat.

* * * * *